(12) United States Patent  
Basseas et al.

(10) Patent No.: US 9,313,568 B2
(45) Date of Patent: Apr. 12, 2016

(54) CUSTOM EARPHONE WITH DOME IN THE CANAL

(71) Applicant: Chicago Custom Acoustics, Inc., Park Ridge, IL (US)

(72) Inventors: Stavros Basseas, Park Ridge, IL (US); Russ Schreiner, Evanston, IL (US); Sargon Khamo, Park Ridge, IL (US); Rony Michael, Park Ridge, IL (US)

(73) Assignee: Chicago Custom Acoustics, Inc., Park Ridge, IL (US)

( * ) Notice: Subject to any disclaimer, the term of this patent is extended or adjusted under 35 U.S.C. 154(b) by 0 days.

(21) Appl. No.: 14/339,074

(22) Filed: Jul. 23, 2014

(65) Prior Publication Data

US 2015/0030196 A1 Jan. 29, 2015

Related U.S. Application Data

(60) Provisional application No. 61/857,303, filed on Jul. 23, 2013.

(51) Int. Cl.
*H04R 25/00* (2006.01)
*H04R 1/10* (2006.01)
*G06F 19/00* (2011.01)
*B29C 33/38* (2006.01)

(52) U.S. Cl.
CPC .......... *H04R 1/1016* (2013.01); *B29C 33/3835* (2013.01); *H04R 2201/105* (2013.01); *H04R 2225/025* (2013.01); *H04R 2225/77* (2013.01)

(58) Field of Classification Search
CPC ............ B29C 33/3842; B29C 33/3835; B29C 33/3828; H04R 2225/77; H04R 2225/025
USPC ................ 264/219; 703/1; 381/322; 700/118
See application file for complete search history.

(56) References Cited

U.S. PATENT DOCUMENTS

| 2,939,923 | A | 6/1960 | Henderson |
| 5,201,007 | A | 4/1993 | Ward et al. |
| 5,487,012 | A | 1/1996 | Topholm et al. |
| 6,401,859 | B1* | 6/2002 | Widmer ............... H04R 25/658 181/135 |
| D591,732 | S | 5/2009 | Burton |
| 8,032,337 | B2 | 10/2011 | Deichmann et al. |
| 2003/0074174 | A1* | 4/2003 | Fu et al. .......................... 703/13 |
| 2006/0239481 | A1 | 10/2006 | Martin |
| 2008/0247461 | A1* | 10/2008 | Nishida .................... 375/240.03 |
| 2011/0068502 | A1* | 3/2011 | Basseas .............. B29C 33/0016 264/219 |

FOREIGN PATENT DOCUMENTS

WO 2011044903 4/2011

* cited by examiner

*Primary Examiner* — Sunita Joshi
(74) *Attorney, Agent, or Firm* — Husch Blackwell LLP

(57) ABSTRACT

An in-ear earphone featuring a housing, an audio output device carried in the housing, a hollow elongated stem formed integral with the housing and a toroidal-shaped ear dome. The stem having a first output end extending therefrom and being audibly coupled at a second input end to the output device. The ear dome integrally formed on the output end of the stem.

14 Claims, 19 Drawing Sheets

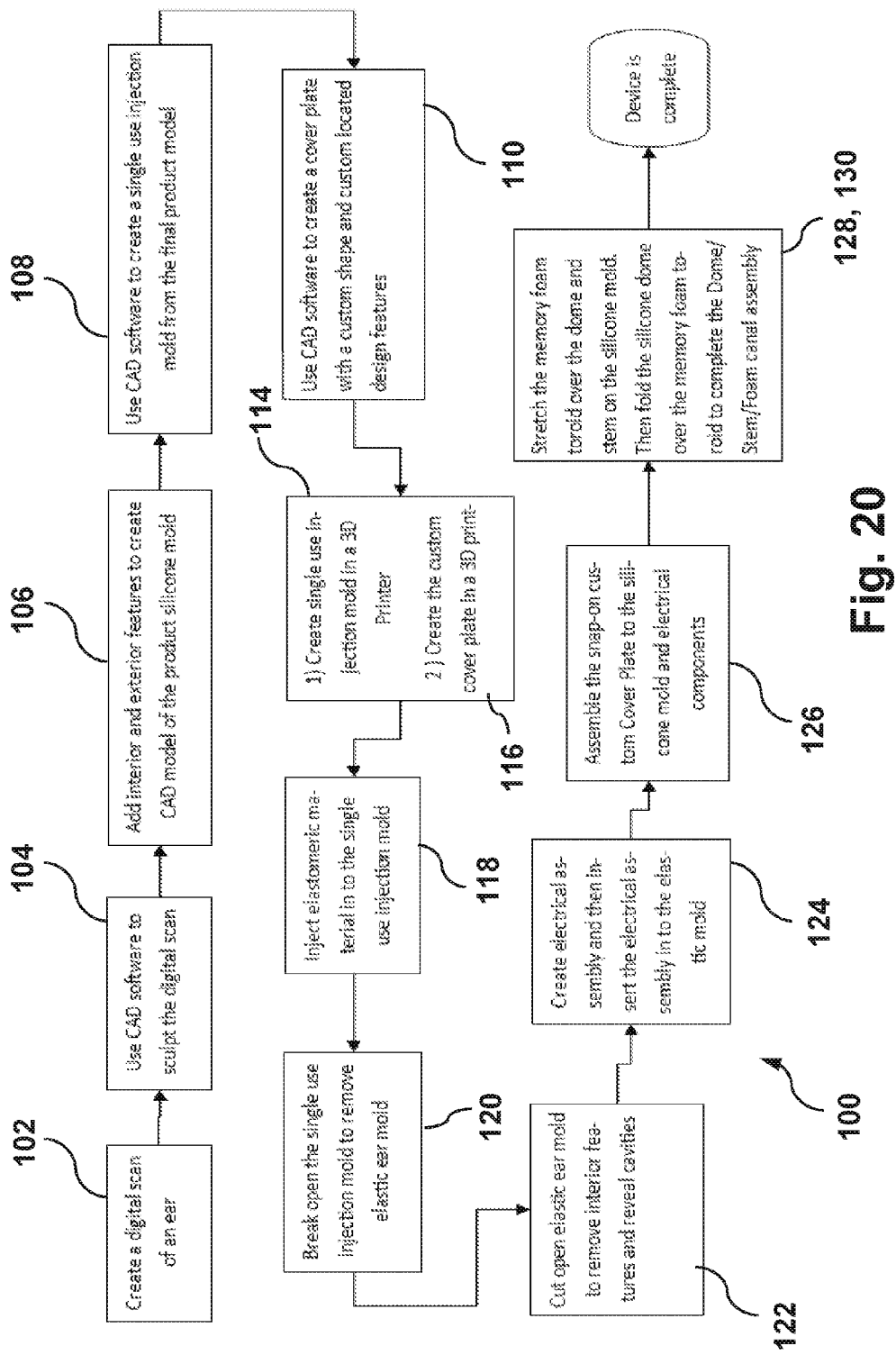

CUSTOM EARPHONE WITH DOME IN THE CANAL

CROSS REFERENCE TO RELATED APPLICATION

This application claims the benefit of U.S. Provisional Patent Application Ser. No. 61/857,303 filed Jul. 23, 2013, the entirety of which is hereby incorporated by reference as if fully set forth herein.

FIELD

The subject invention pertains generally to earphones and more particularly to an in-ear earphone having an integral custom molded stem and ear dome member.

BACKGROUND

Traditional sound producing (hearing aids and earphones) and hearing protective (earplugs and musician plugs) devices generally require: (1) that the device provides a good acoustic seal which is important for device performance and sound quality, and (2) that the device fits comfortably in the ear. Existing methods take many forms with one being the focus of the discussion here—the use of ear domes or ear tips that fit inside the ear and connect to an external electronic device. This method of adapting sound producing devices to the ear through the use of pre-molded ear domes or ear tips is common. This concept is common to everything from hearing aids to off-the-shelf earplugs to common mp3 ear buds.

It is generally known to use digital processes to manufacture hearing devices. These devices typically include a molded canal portion having a custom shape that conforms to the contours of the ear canal. Such devices, however, are typically rigid and are unable to extend to a sufficient depth within the canal to create a good acoustic seal. Accordingly, such devices can be uncomfortable to wear, provide inferior performance and can become easily dislodged or break when the wearer moves his head or jaw.

As an alternate to utilizing a molded canal member, hearing devices can instead incorporate an ear dome attached or secured to an audio output device. In such devices, the ear dome is traditionally a separate unit from the speaker or sound producing device. Thus, it is not connected on the molecular level to the main housing of the earphone and has the disadvantage of requiring mechanical coupling, adhesives or both. The "coupled" dome design is an older concept in that it does not take advantage of the current digital nature of earmold production. Accordingly, dome designs used in known hearing devices are not custom molded to conform to the actual size or shape of the ear.

BRIEF DESCRIPTION OF THE DRAWINGS

FIG. 20 is a flowchart illustrating a method of producing an earphone according to embodiments presented herein.

DETAILED DESCRIPTION

Figure 1A:
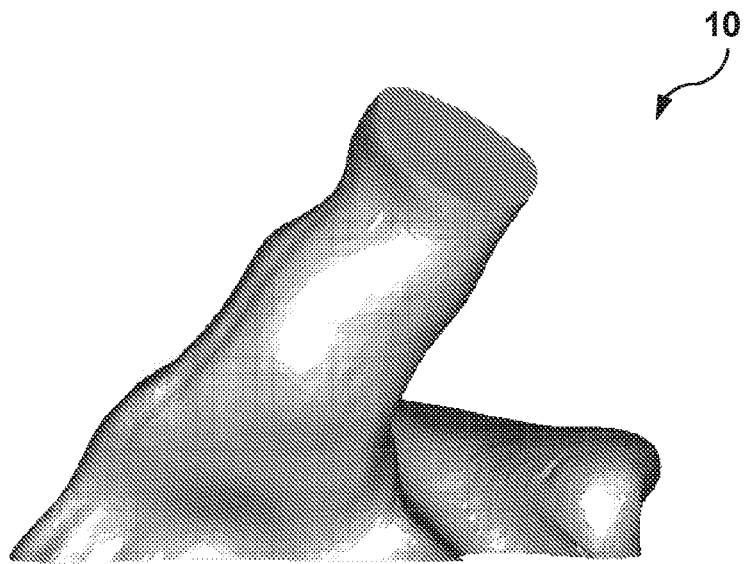
FIG. 1A is an anterior elevation view of a three dimensional impression of an ear according to embodiments set forth herein.

While this invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

As presented herein, embodiments of the subject invention are directed to an in-ear earphone having a custom molded housing integrally formed with a hollow stem and ear dome. In use, the housing portion can be located on the outer portion of the ear and can feature an audio output device and associated circuitry. The stem and ear dome can integrally extend from the housing into a portion of the ear canal. The earphone can be customized to fit securely within the concha portion and outer canal portion of a wearer's ear. The dome portion can be shaped as fully custom or a semi-custom. In addition, the underside of the dome can be fitted with toroid-shaped memory foam element of a size adjustable to the person's ear.

Figure 1B:
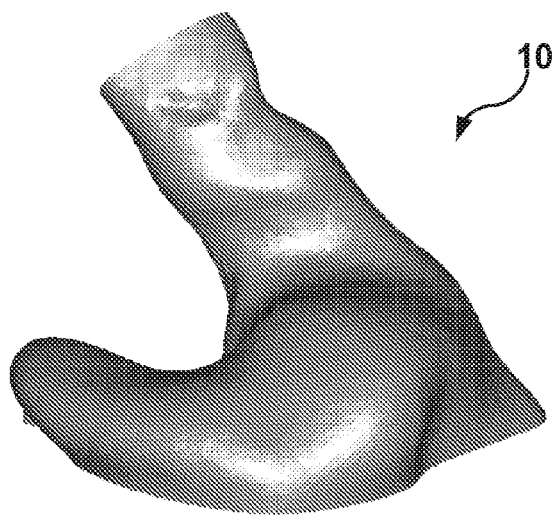
FIG. 1B is a posterior elevation view of the three dimensional impression illustrated in FIG. 1A.

With reference now to the figures, FIGS. 1A and 1B illustrate a three dimensional impression 10 of an ear according to embodiments set forth herein. The impression 10 can be created from a digital scan file of an ear or by an ear impression. When created by an ear impression process, the impression 10 can be acquired through either a direct material cast of the ear cavity and shape which is then placed in a digital scanner. Alternatively, where a scanned image of the ear can be acquired by a direct scan of the ear by a hand held digital scanner.

As described more fully below, the impression 10 of the ear can be loaded into a software program specifically designed for creating earmold products from digitally scanned images—the process is called eSculpting. The process of eSculpting will alter the shape of the original image to adapt it to the shape of a final product. It is during this process that the predesigned features of the ear dome, the interior cavity placeholders and molding features are added to the impression 10.

Figure 2A:
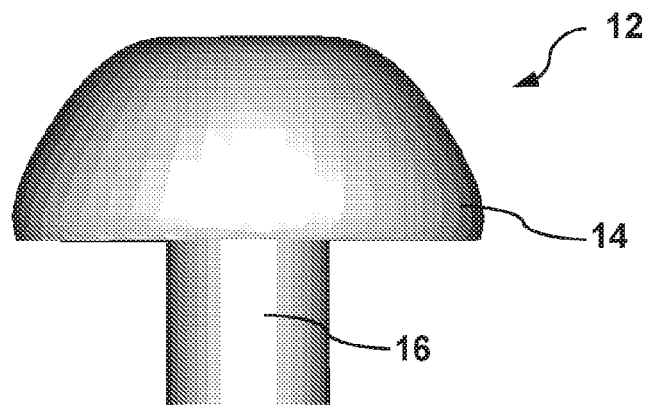
FIG. 2A is an elevation view of an ear dome and stem according to embodiments presented herein.
Figure 2B:
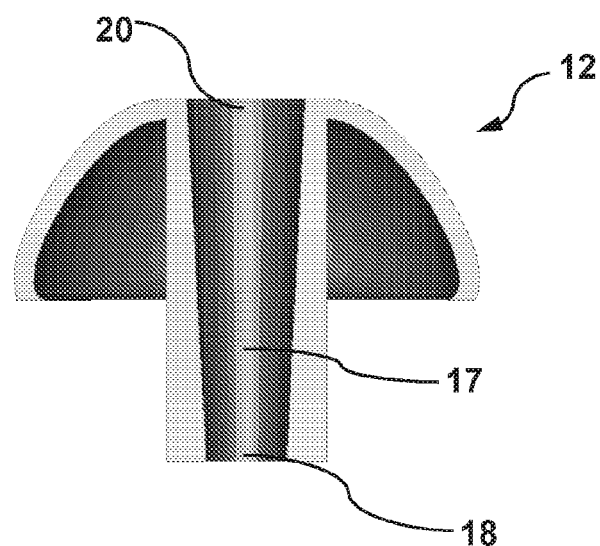
FIG. 2B is a cross-section elevation view of the ear dome and stem illustrated in FIG. 2A.

FIGS. 2A and 2B illustrate a representative ear dome and stem member 12 according to embodiments presented herein. The dome and stem 12 can have a dome-shaped portion 14 and a hollow, elongated stem portion 16 extending therefrom. The stem portion 16 can have an interior channel 17 having an input end 18 and an output end 20. The dome portion 14 can be integrally formed on the output end of the stem portion 16. The dome and stem design 12 can be comprised of a synthetic formable material, such as for example silicone, and can be provided in different sizes and shapes without departing from the novel scope of the subject invention. For example, the diameter of the dome portion 14 or stem portion 16 can vary as can the length of the stem portion 16 in order to accommodate the shape, contours and depth of an individual's ear.

According to embodiments set forth herein, the integral stem and dome design 12 can either be produced from predesigned shapes chosen to best match a particular wearer's ear, or can alternatively be made with a custom-designed dome shape 14 that can be individually fashioned to tightly conform to the contours of the specific wearer's ear. Thus, the earphone can be produced with a "semi-custom" dome made in a variety of sizes in order to have one of the sizes closely match the cross-sectional dimensions of the wearer's ear—with some enlargement to provide seal. Alternatively, the stem and dome can be fabricated from the actual shape of the person's ear in order to closely conform to the ear contours (but again, slightly enlarged to provide a good seal).

If the chosen ear dome is a pre-designed ear dome 14, the canal major and minor axes can be measured and a predesigned dome can be chosen from a predetermined set of domes with different major and minor measurements. If a custom ear dome 14 is chosen, it can be created using a Boolean subtraction of an ear impression 10. According to embodiments presented herein, the integral dome and stem 12 have a number of benefits including comfort, flexibility, good acoustic seal and occlusion reduction.

Figure 3A:
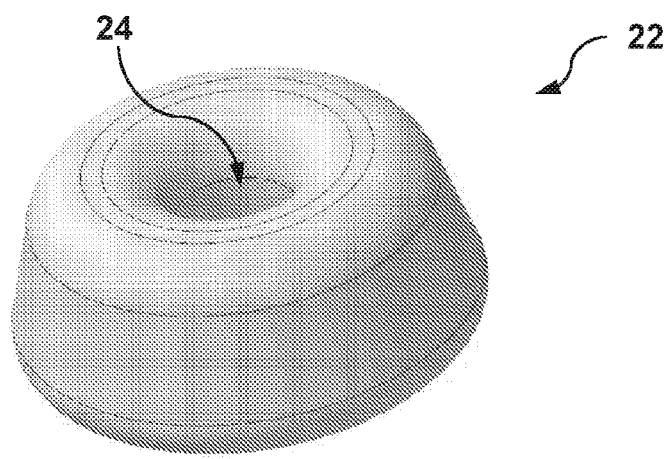
FIG. 3A is a perspective view of a toroidal-shaped element that can be placed around the stem and under the dome according to embodiments of the subject invention.
Figure 3B:
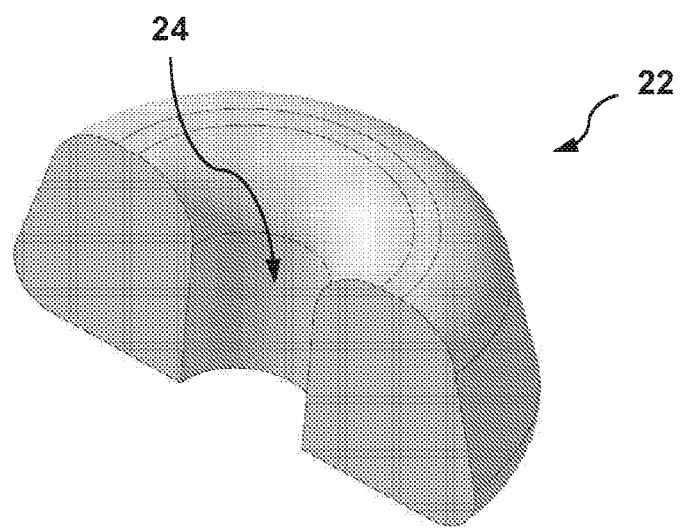
FIG. 3B is a cut away perspective view of the toroidal-shaped element illustrated in FIG. 3A.

FIGS. 3A and 3B illustrate a deformable element 22 that can be placed around the stem 16 and under the dome portion 14. The element 22 can be annular or toroidally-shaped with a hollow interior 24 and can be comprised of foam or polyurethane material. Thus, the element 22 can be easily molded, manipulated and compressed to fit securely underneath the dome portion 14 and around the stem portion 16 of the earphone. Once inserted under the dome 14, at least a portion of the element 22 can recover or expand to fill the interior portion of the dome 14. When the element 22 is added to a dome and stem member 12, it can provide positive force to the outside of the ear which achieves better acoustic seal than off-the-shelf earplugs.

Figure 4:
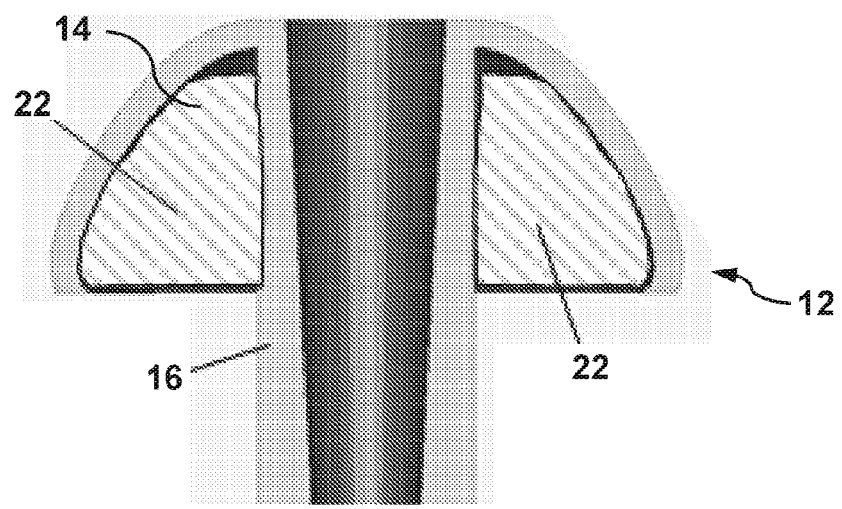
FIG. 4 is a cross-section elevation view of an ear dome with a toroidal element placed under the dome portion.

FIG. 4 illustrates a cross-section view of a dome and stem 12 with the element 22 inserted under the dome 14 and around the stem 16. In this arrangement, the silicone material of the dome and stem 12 can be in contact with the ear surface while the element 22 acts as a light positive pressure sealing device that keeps the silicone in contact with the inner ear skin surface and provides some support for the system when it is inserted in to the ear.

Figure 5A:
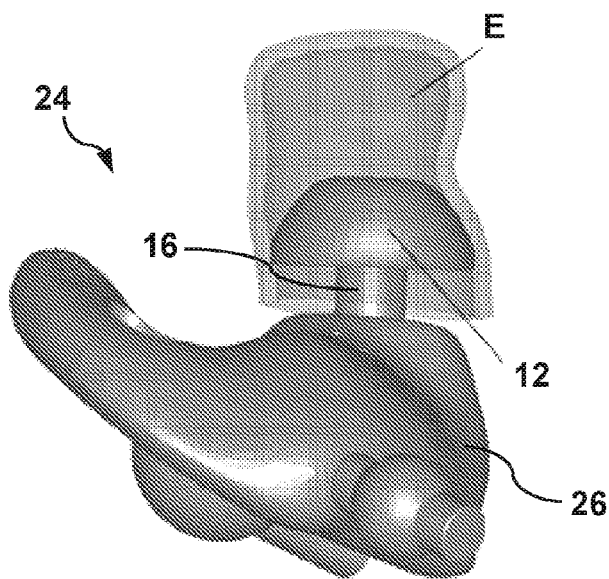
FIG. 5A is a front elevation view of an earphone device partially inserted into an ear canal according to embodiments presented herein.
Figure 5B:
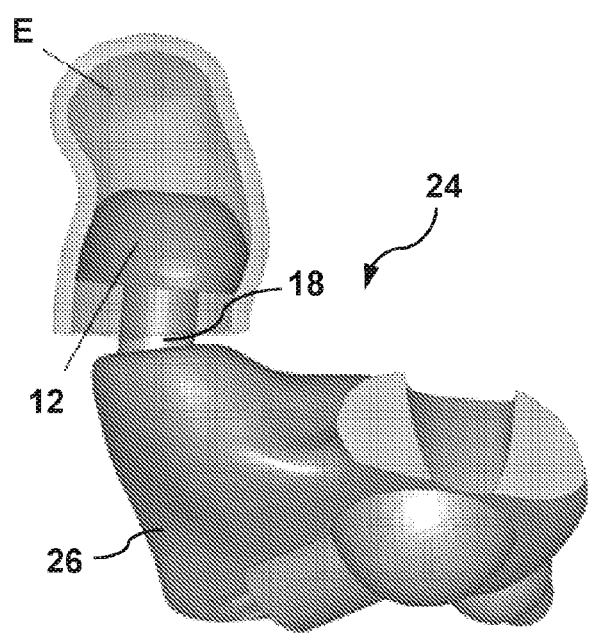
FIG. 5B is a side elevation view of the earphone device partially inserted into an ear canal illustrated in FIG. 5A.

FIGS. 5A and 5B illustrate a first earphone 24 according to embodiments presented herein with the stem and dome 12 partially extending into an ear canal E. The earphone 24 can generally include a dome and stem 12 integrally formed to a housing 26 for carrying an audio input device (not shown). The input end 18 of the stem portion 16 can be integrally formed to the housing 26. The exterior of the earphone 24 can be comprised of a single piece of material, such as for example, silicone and can be provided in a variety of predetermined shapes or sizes or can alternatively be custom shaped/sized to fit securely in a wearer's ear. It will be recognized that the integral configuration provides a single piece design that can be more reliable over devices made from separate components.

The Stem and Dome combination set forth herein can be incorporated onto the custom portion of an earmold using the available sculpting software. Although ear domes in general are not new to in-ear products, embodiments set forth herein provide a greater variety and range of domes, a more personalized selection and creation process for the dome based on the actual dimensions of the ear, and the merging of the Stem and Dome design to the custom portion of the design to create a seamless system combining a custom earmold with an in-ear dome.

Figure 6:
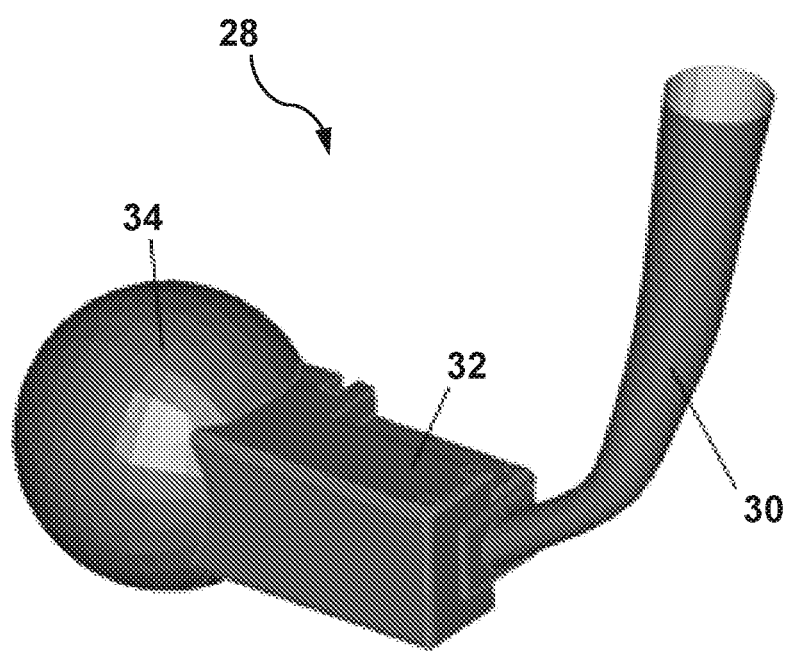
FIG. 6 is a perspective view of the interior components of an earphone according to embodiments presented herein.

FIG. 6 illustrates interior components 28 of the earphone 24. As described more fully herein, the interior components 28 can be located within interior cavities within the housing 26. The interior components can include an elongated sound bore interior object 30, a speaker housing interior cavity object 32 and a wire housing interior cavity object 34. As illustrated in FIG. 6, the speaker housing 32 can connect the wire housing 34 to a first end of the sound bore 30.

An additional benefit is the core that forms the interior cavities used to house the electronic components. In particular, the core design can include a number of novel features, including: 1) a tapered sound bore; 2) a speaker housing area; and 3) a wire storage area. As set forth herein, the tapered sound bore can be used to accentuate the high frequency range of sound; in addition the tapered shape can increase the compliance of the dome and stem to improve comfort. The speaker housing area can be configured to firmly hold an audio output device or speaker in position. The wire storage area can create room for the insertion of a pre-wired electrical assembly and further provide for the strain relief of the electrical cord. In all cases, the placement of these benefits can be fully customized depending on the shape of the person's ear.

Figure 7A:
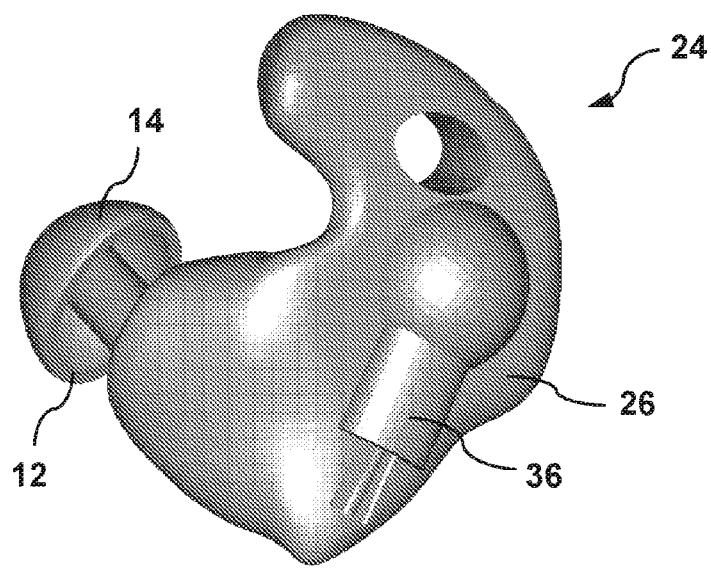
FIG. 7A is an anterior perspective view of an earphone according to embodiments presented herein.
Figure 7B:
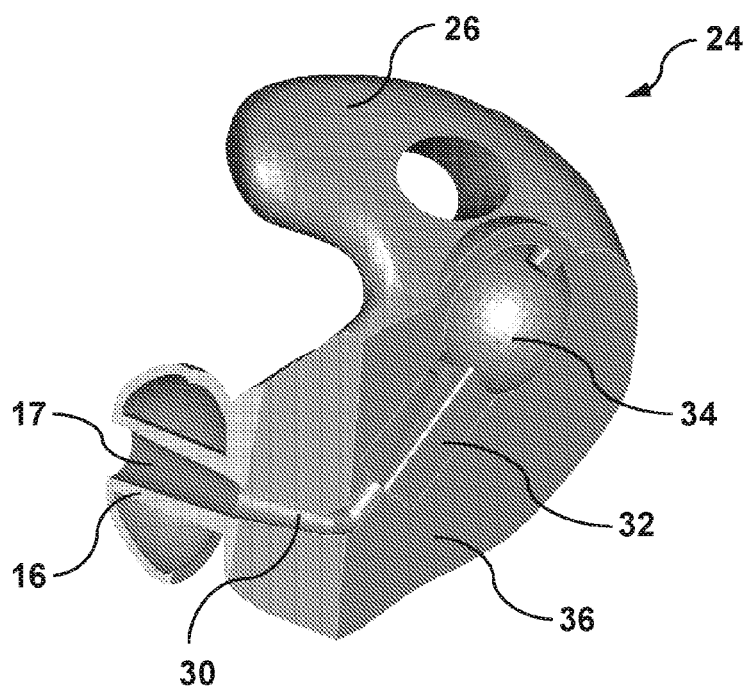
FIG. 7B is a partial cutaway of an anterior perspective view of the earphone illustrated in FIG. 7A.

FIGS. 7A and 7B illustrate alternate views of the earphone 24 illustrated in FIGS. 5A-5B. As shown in these figures, a wire way cover 36 can be placed over the wire housing interior object 32. In addition, the wire housing cavity 34 can extend through the speaker housing cavity 32 into the sound bore 30. The stem and dome member 12 can be integrally coupled to the housing 26 such that the interior channel 17 of the stem portion 16 is aligned with the sound bore 30 to create a continuous channel. As set forth more fully herein, the housing 26 can be comprised of a silicon mold 38 adapted from the initial ear impression 10.

Figure 8A:
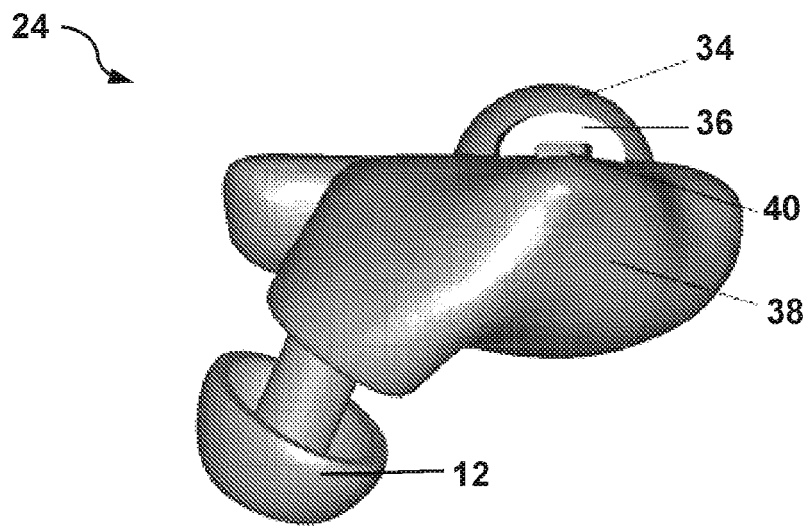
FIG. 8A is a bottom (inferior) view of the earphone illustrated in FIGS. 7A-B.
Figure 8B:
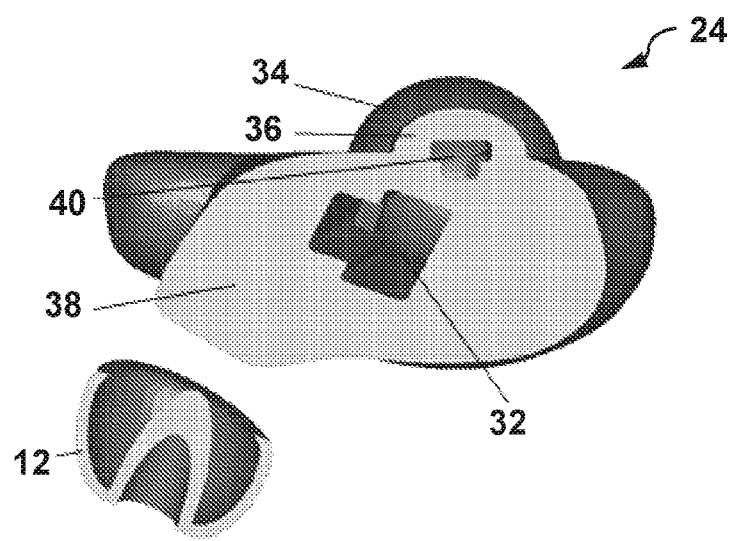
FIG. 8B is a cross section bottom (inferior) view of the earphone illustrated in FIGS. 7A-B and 8A.

FIGS. 8A and 8B illustrate alternate views of the earphone 24. The earphone 24 can feature a wire way cover 36 located over the interior wire housing object. FIGS. 8A and 8B additionally illustrate that the earphone 24 can include a wire way path and relief vent 40. The wire way path and vent 40 can extend into the wire housing cavity 34 and be surrounded by the silicon mold 38 and the wire way cover 36.

Figure 9A:
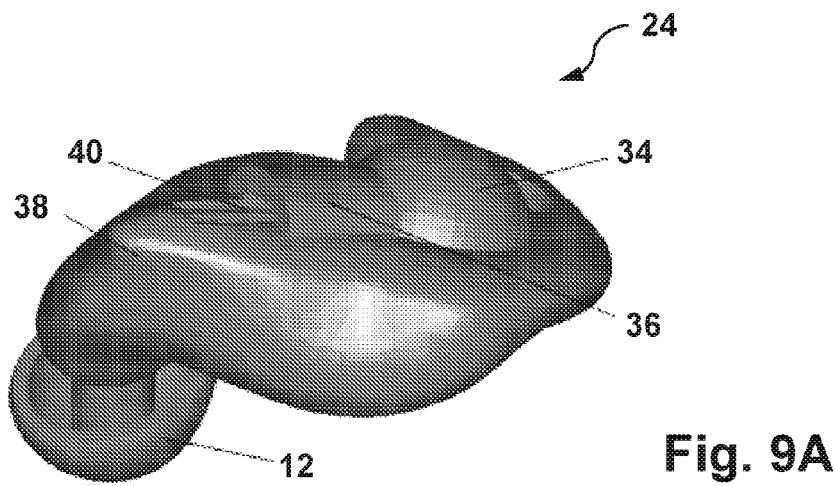
FIG. 9A is a bottom perspective view of the earphone illustrated in FIGS. 7A-B and 8A-B.
Figure 9B:
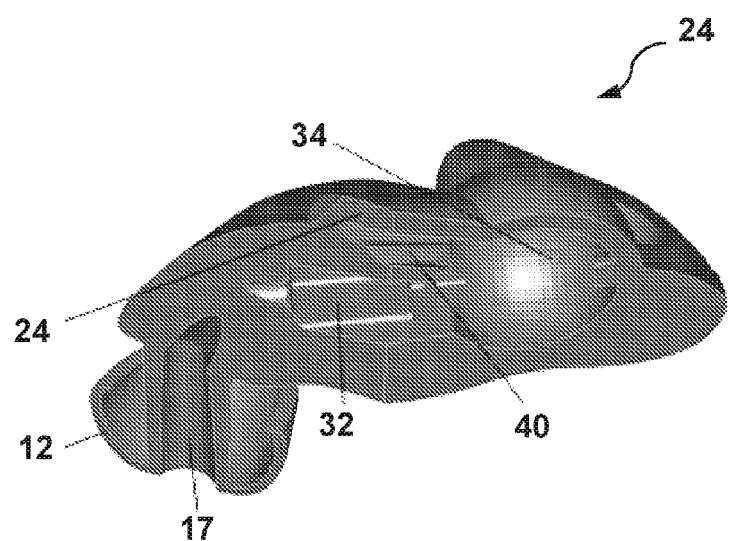
FIG. 9B is a cross section bottom perspective view of the earphone illustrated in FIGS. 7A-B and 8A-B and 9A.
Figure 10A:
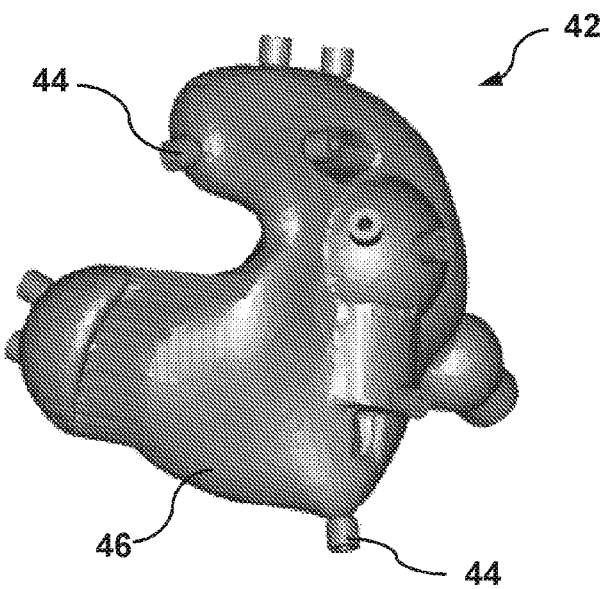
FIG. 10A is a first perspective view of an injection mold that can be used to make an earmold according to embodiments presented herein.
Figure 10B:
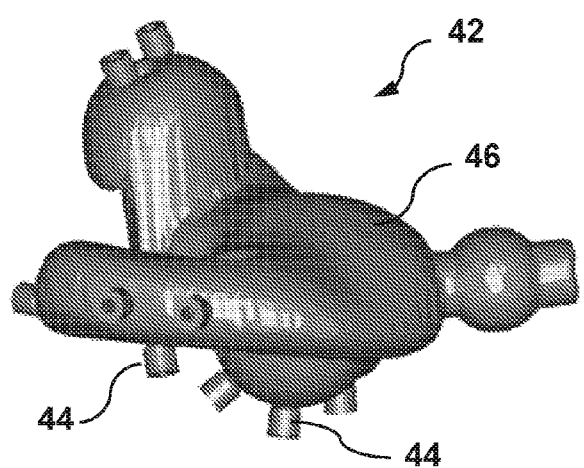
FIG. 10B is a second perspective view of the injection mold illustrated in FIG. 10A.
Figure 11A:
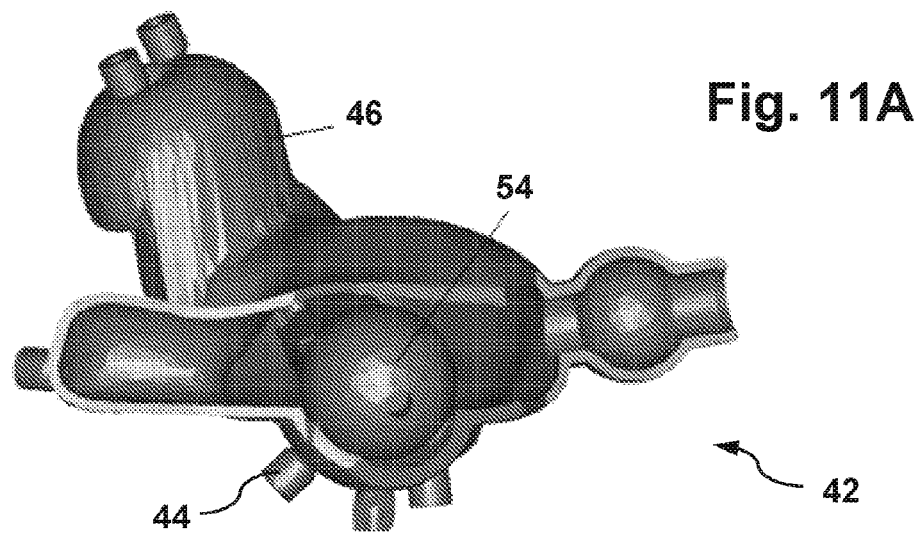
FIG. 11A is a cross section perspective view of the injection mold illustrated in FIGS. 10A-B.
Figure 11B:
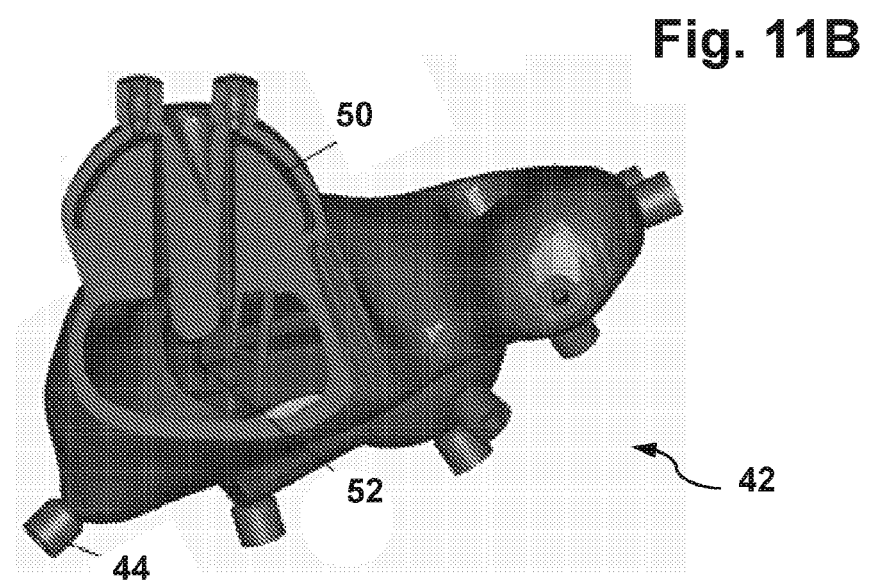
FIG. 11B is a partial cutaway perspective view of the injection mold illustrated in FIGS. 10A-B and 11A.

FIGS. 9A-9B illustrate alternate external and partial cross-section views of the earphone 24. As shown in FIGS. 9A-9B, the wire housing cavity 34 can separately extend into the wire way path and relief pressure vent 40 and also into the speaker housing cavity 32. The interior cavities can be formed into the silicon mold 38. Additionally, the wire way cover 36 can enclose the wire way path and pressure vent 40. FIGS. 9A and 9B additionally illustrate the integral configuration of the housing 36 and the dome and stem 12 which can be formed from the same silicon mold 38.

FIGS. 10A-10B, 11A-11B and 16 illustrate an injection mold 42 that can be used to create the silicone earmold. The injection mold 42 can be a single use device or can alternatively be reused to produce a plurality of earmold devices. The injection mold 42 can be created on a three dimensional printer and can include an exterior housing or casing 46, a hollow interior cavity 48 and a plurality of raised mold vents 44 accessing the central cavity 48 of the mold 42. The interior cavity 48 of the mold 42 can be sized and shaped to produce a correspondingly sized earmold or earphone device according to embodiments presented herein. In particular, the interior cavity 48 can feature stem and dome features 50, a sound bore feature 52 and a wire housing feature 54 for forming the respective portions of the earmold or earphone.

Figure 16:
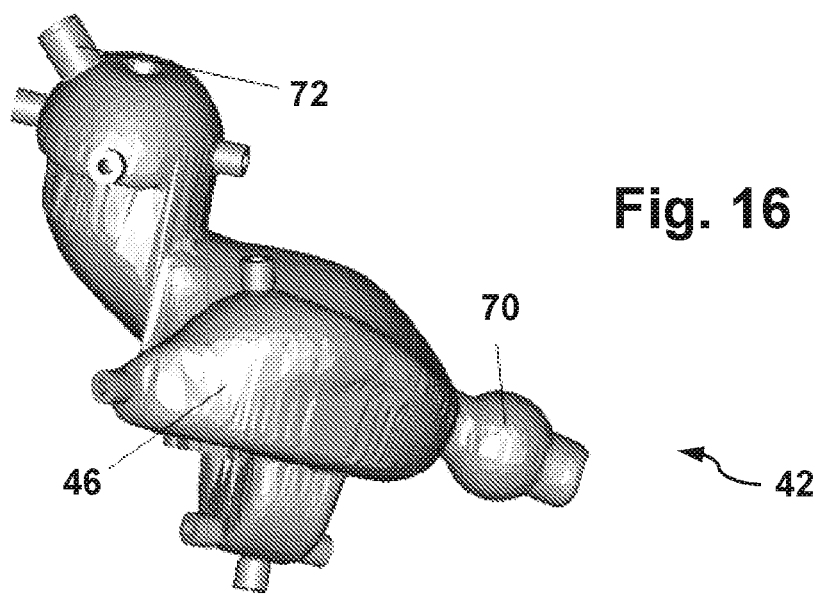
FIG. 16 is a perspective view of an injection mold having two injection ports.
Figure 17A:
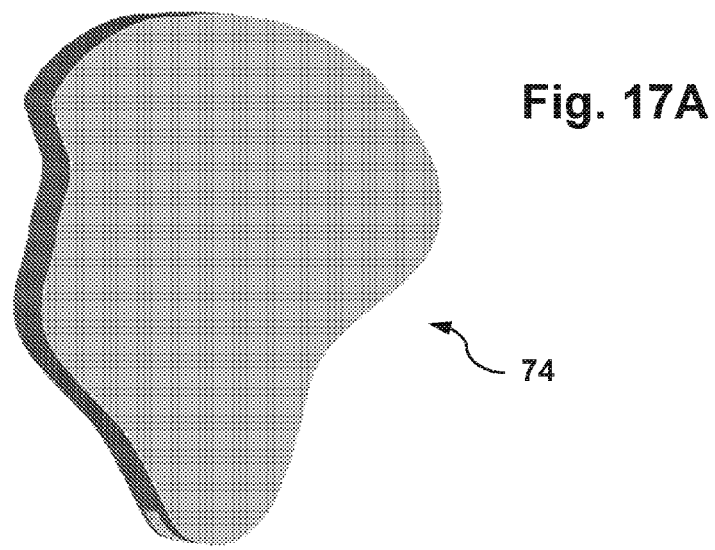
FIG. 17A is a first perspective view of a cover plate according to embodiments presented herein.
Figure 17B:
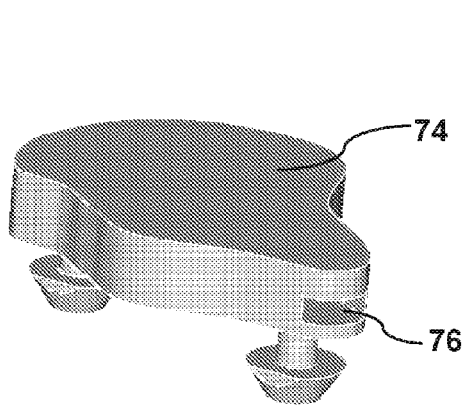
FIG. 17B is a second perspective view of the cover plate illustrated in FIG. 17A.
Figure 17C:
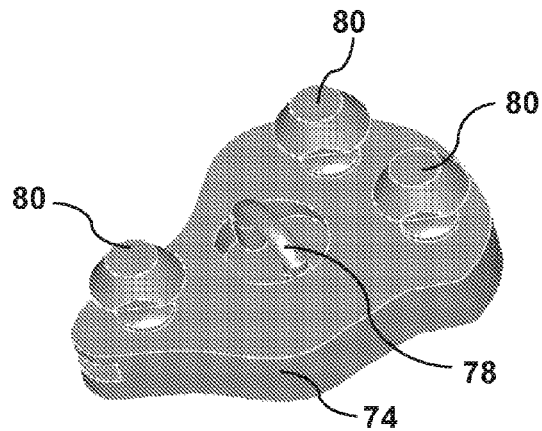
FIG. 17C is a third perspective view of the cover plate illustrated in FIGS. 17A-17B.
Figure 18A:
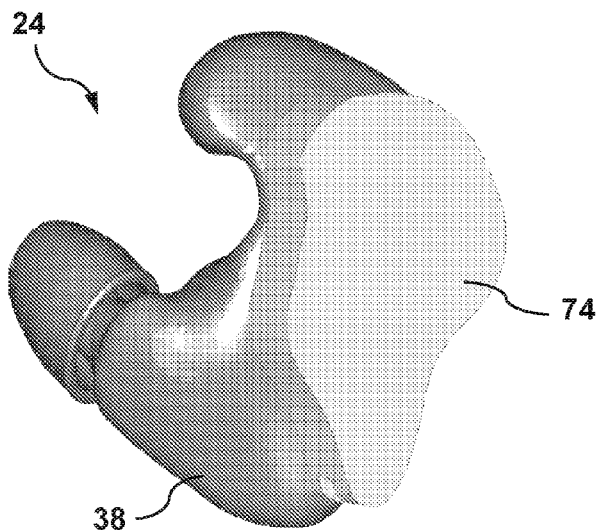
FIG. 18A is a first perspective view of an earphone with the cover plate illustrated in FIGS. 17A-17C attached thereto.
Figures 18B, 18C:
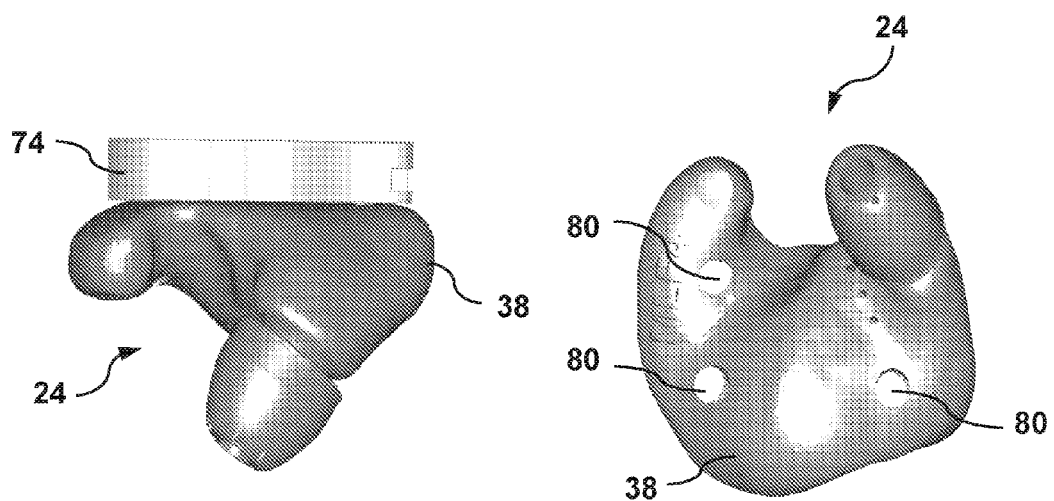
FIG. 18B is an end elevation view of the earphone illustrated in FIG. 18A.
FIG. 18C is a second perspective view of the earphone illustrated in FIGS. 18A-B.

As shown in FIG. 16, the mold 42 can additionally feature injection ports 70, 72 to allow the creation of a composite mold from two different materials such as, for example, soft and hard, or different colors. In use, injection port 70 can allow the filling of the mold 38 with one material and injection port 72 can allow the filling of only the dome and stem portion 12 with a different material.

Figure 12A:
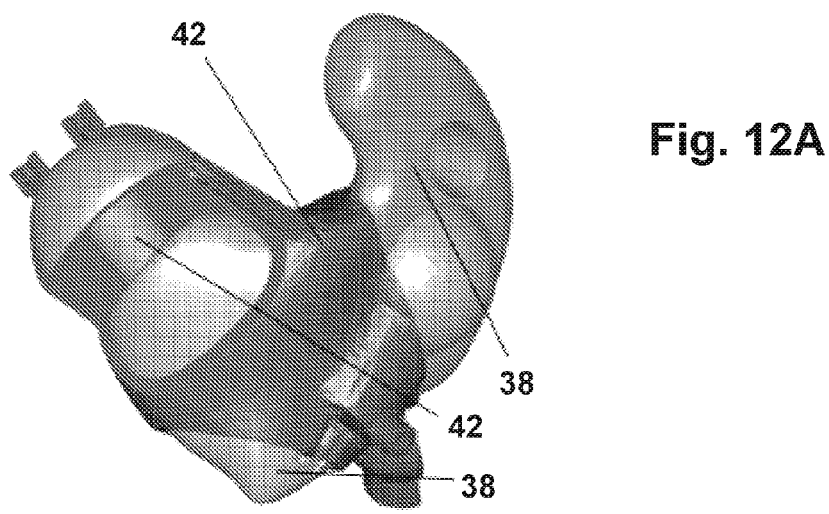
FIG. 12A is a partial cutaway perspective view of an earmold being fabricated in an injection mold according to embodiments presented herein.
Figure 12B:
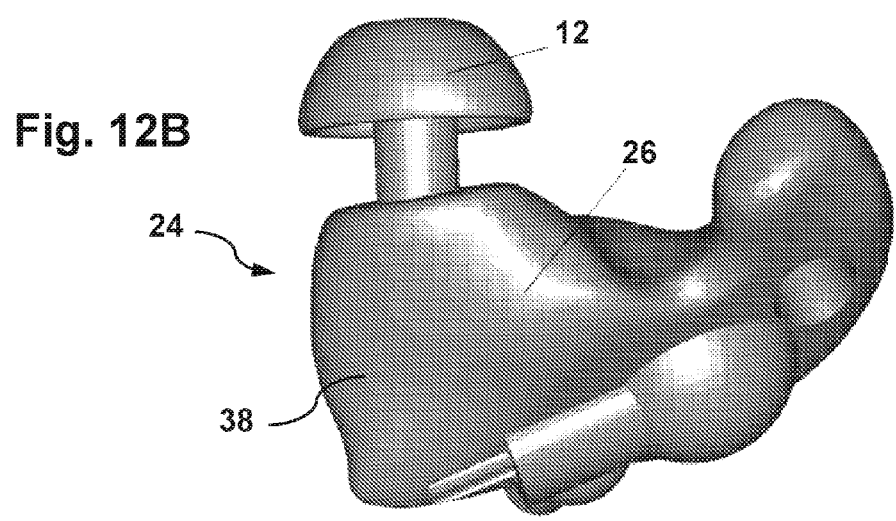
FIG. 12B is a side elevation view of an earphone after being removed from an injection mold according to embodiments presented herein.

FIG. 12A illustrates a partial cutaway of a mold 38 being fabricated in the injection mold 42 during according to embodiments presented herein and FIG. 12B illustrates the final earphone product 24 with the mold 38 featuring a housing 26 integrally formed with the dome and stem member 12.

Figure 13A:
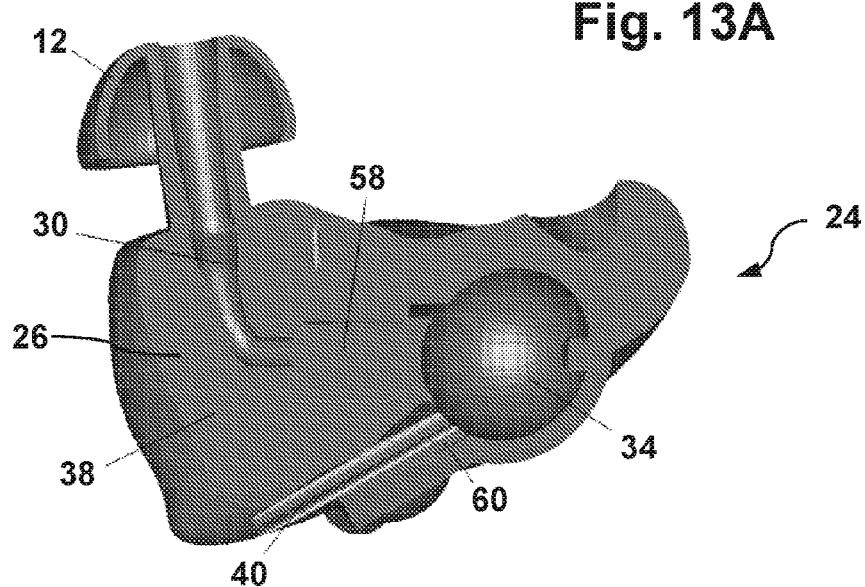
FIG. 13A is a cross section perspective view of the earphone illustrated in FIG. 12B with interior components removed.
Figure 13B:
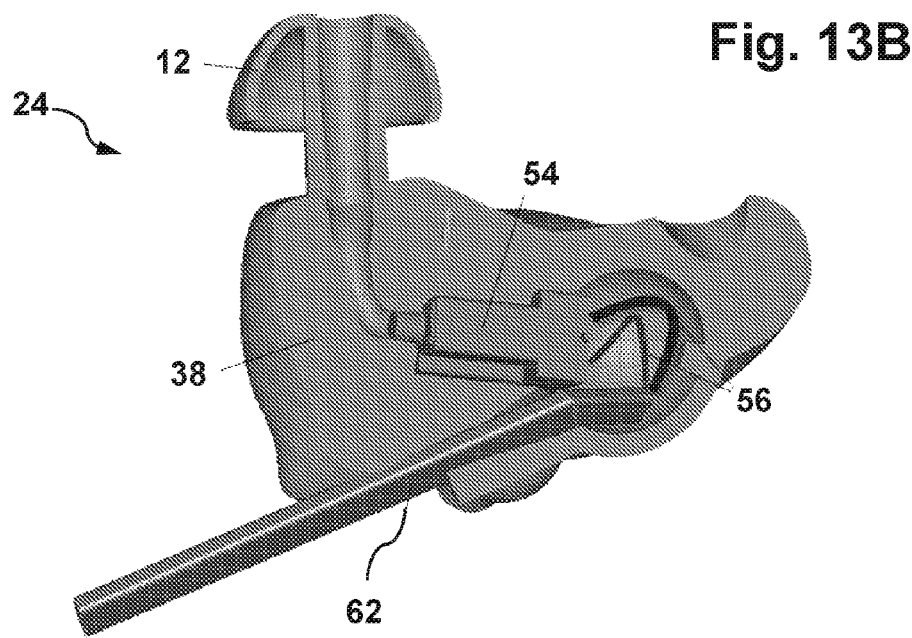
FIG. 13B is a cross section side elevation view of an earphone with the interior components in place.

FIGS. 13A and 13B illustrate additional cross-sectional views of the interior of an earmold or earphone 24 according to embodiments presented herein. According to such embodiments, the earmold 24 can be comprised of a mold 38 including a dome and stem 12 integrally formed to the housing 26. Within the housing 26, the earphone 24 can include a cord housing cavity 34 for accommodating wiring 56 connecting the audio output device 54. The audio output device 54 can be located within the speaker component cavity 58. The earmold 24 can additionally include a sound pressure relief vent 40 and wire way path 60. A cord 62 can extend through the wire way path 60 and relief vent 40 into the cord housing cavity 34.

Figure 14:
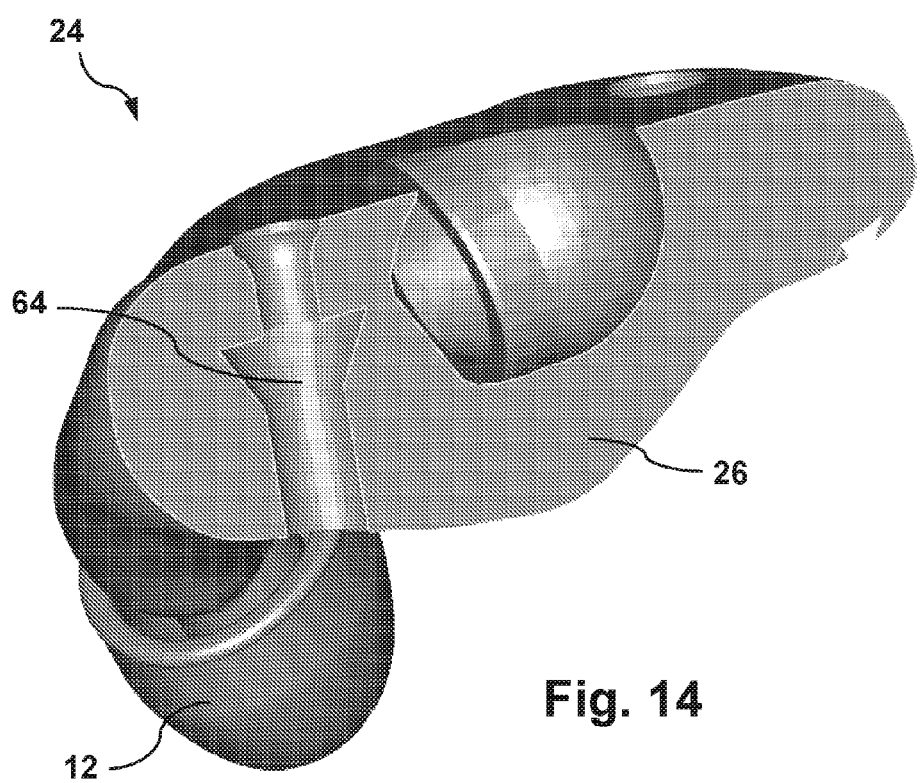
FIG. 14 is a bottom perspective view of an earphone having a cover plate locking device according to embodiments presented herein.

FIG. 14 illustrates an alternate exterior view of the earmold 24 which includes a cover plate locking feature 64 extending along the housing 26.

Another benefit to the subject earphone is the electrical cord exit configuration. Specifically, the exit cord configuration can provide a strain relieved exit channel for the electrical cord and a pressure vent beneath the cord that can enhance the bass sound performance of the product. These features, individually and together provide an improved earphone product over known hearing aid devices. In addition, a further benefit of this configuration is that the strain relief cord is built into the custom components which can reduce the size and cost of the assembly.

Figure 15:
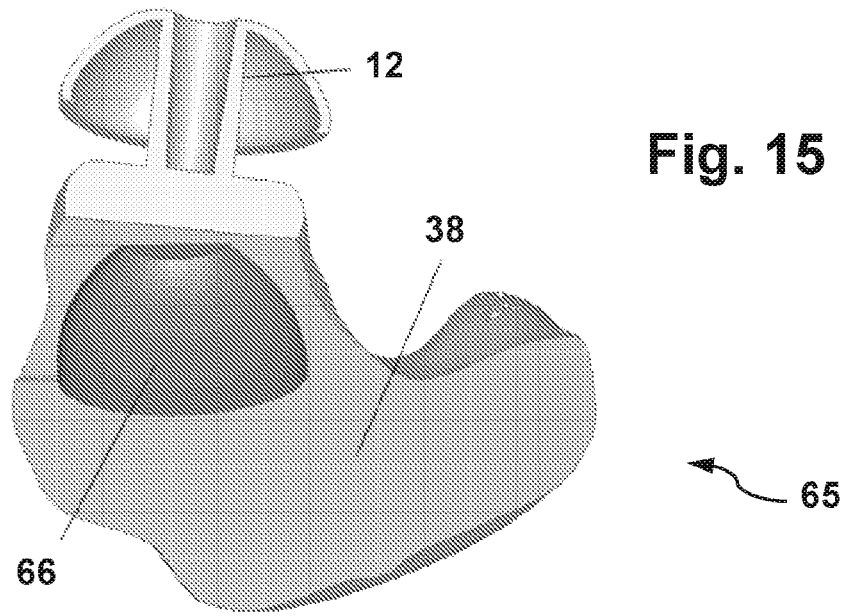
FIG. 15 is a cross section side elevation view of an earphone having a dome and foam filled cavity according to embodiments presented herein.

FIG. 15 illustrates an earmold 65 for use as a hearing protection device. As shown in FIG. 15, instead of including interior sound producing and electrical components, the interior of the housing can contain a sound dampening filling 66. The sound dampening filling 66 can be comprised of as gels, foams, liquids or air and can further block or diminish sounds from reaching the eardrum. It will be recognized that the benefit of such configuration is that the sound dampening is improved and therefore the ear protection device functions better than one made from a single material.

FIGS. 17A-17C and 18A-B illustrate the cover plate 74 that can be secured to the earmold according to embodiments presented herein. As shown in FIGS. 7B and 7C, the cover plate 74 can include a cover plate wire way 76, strain relief feature 78 and locking pins 80.

Figure 19A:
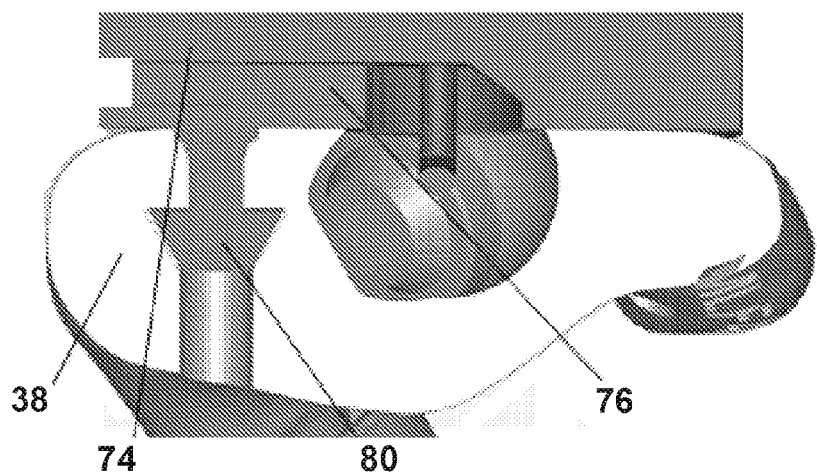
FIG. 19A is a first partial cutaway perspective view of an earphone having interior components inside the molded body.
Figure 19B:
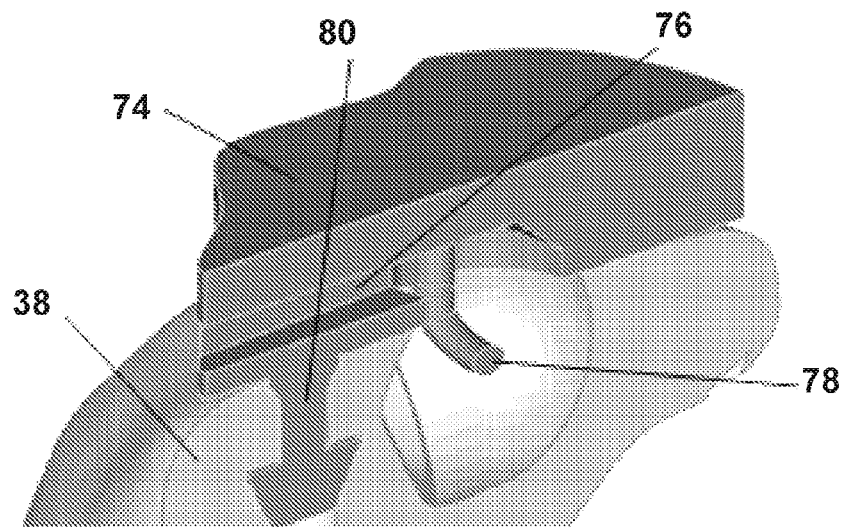
FIG. 19B is a second partial cutaway perspective view of the earphone illustrated in FIG. 19A.

The cover plate 74 provides a protective cover for the interior cavities of the silicone mold and can further act as a part of the electrical housing in that the earphone wires are routed through the cover plate. In addition, in some cases, electrical plugs or other components can also be housed inside the cover plate 74. The cover plate 74 can further provide a surface for labeling. The cover plate 74 can be a custom designed piece in that the outer shape, the wire way features or component housings and the mechanical connection features are always in unique locations depending on the shape and size of the person's ear. FIGS. 18A-18C and 19A-19B illustrate the cover plate 74 mechanically secured to the silicone mold 38 of the earphone 24 with a plurality of locking pins 80. FIGS. 19A-19B additionally illustrate cross-sectional views of the device showing the location of the cover plate wire way 76 and strain relief feature 78 when the cover plate 74 is secured to the mold 38.

Embodiments presented herein can rely on computer-readable instructions or software to define the unique shape of the cover plate based on the shape of the silicone mold. The software can also be used to add features to the cover plate which includes Boolean merges and subtractions. The cover plate can then be printed in Acrylic plastic in a 3D printer. Once printed the cover plate can be included in the electrical assembly process if components are placed or routed through the cavities in the cover plate. The cover plate can also be affixed to the silicone mold using barbed pins located on the cover plate that snap into corresponding cavities in the silicone mold.

The earphone, earmold and/or hearing protection device presented herein has a number of benefits over known earphone designs. In particular, the subject device can: (1) achieve a better acoustic seal than a tight-fitting, full custom canal devices due to the improved compliance (softness) and flexibility of the dome and foam material; (2) provide improved comfort as compared to full canal fit devices; (3) require less material and are generally less expensive to produce; (3) extend deeper into the ear canal to reduce the occlusion effect; (4) require less repair or replacement by reducing the possibility of leaks or weak seams between coupled components or by inadequate coupling machines, and (5) achieve lower noise levels associated with jaw movement and leaks which are commonly associated with the continual loss and regain of an acoustic seal experienced using a tight fitting, filled canal.

FIG. 20 is a flowchart illustrating a method 100 of creating an earmold or earphone according to embodiments set forth herein. The earphone can be made by utilizing a combination of new design elements and fabrication methods that build on advances in custom earmold and hearing aid shell design and fabrication. For example, an impression of a person's ear can be created 102 through the injection of silicone into the ear and ear canal, or the outer ear and canal entry areas can be scanned with a laser or white light scanner. Once the impression is obtained, an electronic device having a programmable processor and computer-readable instructions or software, such as for example computer-aided design (CAD) software, can process the scanned image to fashion or sculpt 104 the shape of the product. Predesigned interior and exterior features can also be added 106 to the mold and merged into the digital image of the mold.

An injection mold can be created 108 from a model of the mold. The creation of the mold can be accomplished by an electronic processing device that can execute computer-readable instructions or software, such as for example computer-aided design (CAD) software. A cover plate having a custom shape and design features located in custom positions can also be designed 110 by the electronic device and executable software.

A digital file of the final product design can then be output to a three dimensional rapid prototyping/manufacturing machine, such as a 3D printer where an injection mold can be created 114 and injected 118 with silicone or other elastomeric material. The design for the custom cover plate can also be output to a 3D printer and created 116 by the 3D printer.

Once the silicone cures, the outer "shell" of the mold can be cracked open and removed 120 to reveal the silicone mold on the inside. The silicone mold can then be cut open 122 to allow the removal of internal core pieces which leave behind cavities in the mold that will house electronic components such as speakers, amplifiers, circuit boards, wires, switches, etc. This process can be carried out by utilizing the elastomeric nature of the silicone material used to form the device. In particular, the silicone material can be stretched to allow access and removal of the interior core pieces even when extensive undercuts are present. This can also be done by making an incision into the silicone. For instance, an indent on the core piece can be formed to allow a tool to hook into the core piece in order to simply removal.

The silicone can be also stretched to allow the large core pieces to pass through the incision without further tearing or damage to the earmold. Since the elastomeric nature of the silicon material generally has a fast memory, the earmold can rapidly return to its original shape and form leaving no gap in the area of the incision. The incision can also be sealed after assembly with a silicone adhesive if required.

After the core pieces are removed an electrical assembly can be assembled and inserted 124 into the elastomeric mold as in the case of an active device like earphones and hearing aids. Alternatively, the cavities can be filled with a sound dampening material such as gels, foams, liquids or air in the case of hearing protection devices.

The custom cover plate can be assembled and secured to the silicon mold 126 and the electrical components. The toroidal-shaped foam element can also be stretched 128 over the dome and stem member on the silicon mold and the dome can be folded 130 over the foam element to complete the assembly of the dome and stem member.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be added to, or removed from the described embodiments.

What is claimed is:

1. A method comprising:

establishing a representation of a shape of an ear concha and an ear canal cavity, including outer and inner canal cavities;

removing an inner ear canal portion of the shape and replacing it with a custom earmold having an integrally formed stem and dome member, the stem and dome member dynamically configured to fit into at least a portion of the inner canal cavity by sizing the dome member to have an outer diameter larger than a cross-sectional dimension of the ear canal cavity;

establishing a custom earmold by forming a body portion with multiple internal cavities; forming the stem and dome member integral with the body portion, the stem extending from the body portion and having opposing first and second ends, the first end integrally formed to the body portion and the dome member integrally formed around the second end of the stem, the dome member having a substantially mushroom-like shape with a substantially flat top surface and a rounded peripheral side edge extending downward from the top over at least a portion of the stem to define a space between the stem and an underside of the peripheral side edge, the body portion, stem and dome being a single integral unit; forming a hollow interior channel in the stem having a tapered diameter along its length, the interior channel at the second end having a diameter greater than a diameter of the interior channel at the first end;

creating a mold for producing the custom earmold, the creation of the mold comprising creating an interior cavity shaped to correspond to that of an exterior of the earmold and integral stem and dome member;

establishing an earmold custom cover plate by designing and forming a custom panel shaped to cover the internal cavities of the earmold; selecting attachment locations on the panel for securing the cover plate to the earmold; forming a plurality of locking pins at the attachment locations, the locking pins extending substantially perpendicular from a side of the panel; forming a cavity in the panel, the cavity being adapted such that electrical components can be routed therethrough; and securing the cover plate to the earmold by inserting the locking pins into corresponding recesses in the body of the earmold, the locking pins having a barbed end portion opposite the panel, when the locking pins are inserted into the corresponding recesses in the earmold, the barbed end portions removably snapping the cover plate into place on the earmold.

2. The method as in claim 1 further comprising adding a memory foam insert in the shape of a toroid on the stem and underneath the dome member, the insert dynamically fitting into the ear canal.

3. The method as in claim 1 further comprising:
measuring a shape of the inner ear cavity and angle, and
providing electronic instructions stored on a computer readable medium, the instructions being executable by a programmable processor and control circuitry, the instructions selecting an appropriate semi-custom stem and dome member from a pre-designed set containing multiple stems and dome members having a variety of shapes.

4. The method as in claim 1 further comprising deleting interior material from the representation using unique designed objects arranged in accordance with a shape of the representation, the deletion producing a substantially hollow region in the concha and the outer ear canal cavity, the hollow region being in a shape suitable for acting as a housing for electrical components or other sound dampening material or air.

5. The method as in claim 1 further comprising deleting interior material from the representation with designed objects arranged in accordance with a shape of the representation, the deletion producing a sound bore with a horn effect that enhances acoustic performance by accentuating high frequencies.

6. The method as in claim 1 further comprising extracting a surrounded feature defining extensions from within elastomeric material forming the earmold, the extracting including temporarily distorting the elastomeric material to remove the extensions.

7. The method as in claim 1 further comprising extracting a surrounded feature defining extensions from within elastomeric material forming the earmold, the extracting being aided by design features of the extracted objects.

8. The method as in claim 7 where the design objects create interior cavities of the earmold, the design objects being included in or attached to an injection mold device by electronic instructions stored on a computer readable medium, the instructions being executable by a programmable processor and control circuitry.

9. The method as in claim 8 further comprising adding the design objects to the injection mold, the adding aiding in strain relief of cord components.

10. The method as in claim 8 further comprising adding the design objects to the injection mold, the adding aiding in acoustic performance of the earmold by improving sound quality of low frequency sounds.

11. The method as in claim 8 further comprising adding the design objects to the injection mold, the adding including the stem and dome member as a single piece with a final earmold product.

12. The method as in claim 1 further comprising injecting or inserting a gel, foam, liquid or air into a created cavity, the injecting or inserting acting as a sound dampening media in a final earmold product.

13. The method as in claim 4 further comprising injecting different elastomeric materials into the earmold, the injecting creating a final product that is a composite of a plurality of materials having different hardness, color, texture or strength.

14. A method comprising:
providing a three-dimensional printer;
providing electronic instructions stored on a computer readable medium, the instructions being executable by a programmable processor and control circuitry to activate the printer;
establishing a custom silicon earmold based on the shape of an outer ear of an ear impression, the custom earmold being established by forming a body portion with multiple internal cavities; forming a stem and dome member integral with the body portion, the stem extending from the body portion and having opposing first and second ends, the first end integrally formed to the body portion, the dome member integrally formed around the second end of the stem the dome member having a substantially mushroom-like shape with a substantially flat top surface and a rounded peripheral side edge extending downward from the top over at least a portion of the stem to define a space between the stem and an underside of the peripheral side edge, the body portion, stem and dome being a single integral unit; forming a hollow interior channel in the stem having a tapered diameter along its length, the interior channel at the second end having a diameter greater than a diameter of the interior channel at the first end;
establishing a custom cover plate based on the shape of an outer ear of an ear impression, the cover plate having an electrical housing panel labeling area, a plurality of locking pins extending therefrom and a cavity, the locking pins having a barbed end portion opposite the housing panel and the cavity being sized to accommodate cord components extending therethrough; and
attaching the cover plate to the silicon earmold by inserting the locking pins into corresponding recesses in the earmold, the end portions of the locking pins snapping into place in the recesses to secure the cover plate to the mold.

* * * * *